(12) United States Patent
Parker

(10) Patent No.: US 10,508,962 B2
(45) Date of Patent: Dec. 17, 2019

(54) PRINTABLE HIGH PRESSURE IRREVERSIBLE INDICATING MATERIAL

(71) Applicant: Volk Enterprises, Inc., Alpharetta, GA (US)

(72) Inventor: Robert Parker, Bend, OR (US)

(73) Assignee: Volk Enterprises, Inc., Alpharetta, GA (US)

( * ) Notice: Subject to any disclaimer, the term of this patent is extended or adjusted under 35 U.S.C. 154(b) by 0 days.

(21) Appl. No.: 16/467,110

(22) PCT Filed: Dec. 7, 2017

(86) PCT No.: PCT/US2017/065086
§ 371 (c)(1),
(2) Date: Jun. 6, 2019

(87) PCT Pub. No.: WO2018/106901
PCT Pub. Date: Jun. 14, 2018

(65) Prior Publication Data
US 2019/0316982 A1 Oct. 17, 2019

Related U.S. Application Data

(60) Provisional application No. 62/432,013, filed on Dec. 9, 2016.

(51) Int. Cl.
*G01L 7/00* (2006.01)
*G01L 23/00* (2006.01)
*G01L 1/24* (2006.01)

(52) U.S. Cl.
CPC .............. *G01L 23/00* (2013.01); *G01L 1/241* (2013.01)

(58) Field of Classification Search
CPC ................................ G01L 23/00; G01L 1/241
See application file for complete search history.

(56) References Cited

U.S. PATENT DOCUMENTS

| | | | | |
|---|---|---|---|---|
| 7,517,146 B2* | 4/2009 | Smith | .................... | G01K 11/06 374/162 |
| 8,402,832 B2* | 3/2013 | Ribi | ........................ | G01L 11/02 73/700 |
| 8,640,546 B2* | 2/2014 | Trahan | ...................... | G01L 7/00 73/700 |
| 9,335,187 B2* | 5/2016 | McClure | .................... | C09J 5/00 |
| 9,604,485 B2* | 3/2017 | Greener | ................ | B41M 5/124 |
| 9,625,330 B2* | 4/2017 | Park | ........................ | G01L 1/205 |
| 10,022,942 B2* | 7/2018 | Brown | .................... | B32B 27/32 |
| 10,345,278 B2* | 7/2019 | Wang | ........................ | A23L 5/40 |
| 2009/0145347 A1* | 6/2009 | Nakamura | ............ | G01K 11/125 116/216 |
| 2009/0183669 A1* | 7/2009 | Scott | ...................... | G01K 11/16 116/216 |
| 2013/0061681 A1* | 3/2013 | Trahan | ...................... | G01L 7/00 73/700 |
| 2014/0138011 A1* | 5/2014 | McClure | .................... | C09J 5/00 156/64 |

(Continued)

*Primary Examiner* — Freddie Kirkland, III

(74) *Attorney, Agent, or Firm* — Laurence P. Colton; Smith Tempel Blaha LLC

(57) ABSTRACT

A pressure indicator comprising a printed or coated film with micron sized particles disbursed in a transparent binder, wherein the particles change from white to transparent when exposed to high pressure.

20 Claims, 3 Drawing Sheets

(56) References Cited

U.S. PATENT DOCUMENTS

2015/0283839 A1* 10/2015 Greener ............... B41M 5/124
 600/587
2016/0152011 A1* 6/2016 Brown .................. B32B 27/32
 428/315.5

* cited by examiner

PRINTABLE HIGH PRESSURE IRREVERSIBLE INDICATING MATERIAL

BACKGROUND OF THE INVENTION

Technical Field

This invention is related generally to the field of high pressure indicators and more specifically to the field of high pressure irreversible indicators for showing if a certain pressure has been reached and/or if an item has been subjected to a certain pressure. This invention also is related generally to the field of food safety and food quality and more specifically to the field of using high pressure to kill harmful organisms in food products. The invention further is related generally to the field of mechanical pressure indication and more specifically to the field of indicating mechanically generated pressure from nip roller adjustment and impact.

Prior Art

Food safety and food quality has led to many ways to kill harmful organisms in our food. A primary method is to use high temperature exposure for a certain period of time to destroy dangerous organisms in our food, namely, pasteurization. However, this can cause changes in food taste, texture, and color that can cause potential consumers to avoid purchasing these pasteurized food products, such as lunch meats, prepared and sliced poultry and other meats, guacamole, and juices, as just a few examples.

To avoid such changes in food products, more and more food products are packaged in poly bags and subjected to very high pressure, such as in the range of 6,000 atmospheres (atm)/87,000 pounds per square inch (psi), for some period of time, such as in the range of 3 minutes (min). This is normally accomplished by loading a thick walled autoclave with the food product and then using highly pressurized water to supply very high hydrostatic pressure, which in turn can kill dangerous bacteria and other organisms. Such pressure treatment also can up to triple or more shelf life of the food product and allows room temperature storage and shipping, avoiding in some instances expensive refrigeration while preventing discoloration, changes in texture, and changes in taste.

High pressure treatment is a batch process. When treating hundreds of millions of units, the possibility exists that some of the food products may not be properly exposed to the large hydrostatic pressure. Therefore, it is desirable to have some indicator to show the food products has been subjected to proper pasteurization and/or pressure and can be safely consumed.

The use of high pressure pasteurization has become a standard method for destroying bacteria in foods. Current normal methods such as heating foods to destroy bacteria are known, and can alter the taste and texture of certain foods. For example, sliced lunch meats, such as turkey and chicken, and guacamole will be altered if exposed to high temperatures.

High pressure pasteurization or sterilization methods also are known. For example, foods and other items are packaged in sealed flexible poly bags. The bagged food then can be placed in an autoclave and hydrostatically pressurized using water as a medium to achieve a pressure of 85,000 psi for a period of time. Such a pressure will destroy the bacteria, thus increasing the shelf life of the bagged food. However, if the food did not get properly pressurized and was placed on the shelf and had active bacteria that caused sickness in consumers it might result in a total recall of the packages. Because of this possibility, it is desirable to have an inexpensive irreversible indicator to show that every package had been exposed to 85,000 psi or any other desired pressure.

Dr. Hans Ribi has used a printed or coated microencapsulated dye system that can rupture when exposed to high pressure, causing a color change. This concept is subject to a potentially large variability depending on capsule wall thickness and other variables. It is also difficult to design a material that will color change at some prescribed pressure and time. Similarly, Chromatic Technology Inc. (CTI) uses ruptured microencapsulated dye systems to indicate high pressure exposure.

The instant inventor Robert Parker has used an injection molded unit to extrude a pigmented wax material from a reservoir or larger volume into a small volume until the volume and pressure in the vessel reached some critical value. By noting the movement of the pigmented wax, one could determine the hydrostatic external pressure. This approach can be too costly and difficult to apply to hundreds of millions of food products or packaging.

Accordingly, there is a need for an indicator that can be applied or attached to a food product unit or a food product packaging unit to show whether that particular food product unit or food product packaging unit has been subjected to a particular pressure. There also is a need for an indicator that can be applied or attached to other types of products or packaging to show whether that particular product or packaging has been subjected to a particular mechanical pressure. Such an indicator preferably is inexpensive to make and use and safe to use. Such an indicator also preferably is consistent in results whereby users and consumers can be comfortable with the results indicated. It is to these needs and others that the present invention is directed.

BRIEF SUMMARY OF THE INVENTION

Briefly, the present invention is a device and method for use with high pressure sterilization and pasteurization techniques. The inventive device visually indicates whether a certain pressure has been reached and the inventive method uses the inventive device in connection with, for example, food products during a high pressure process. The present invention also is a device and method for use with mechanical pressure techniques. The inventive device visually indicates whether a certain pressure has been experienced and the inventive method uses the inventive device in connection with, for example, mechanical pressure producing devices such as nip rollers and the like.

A complete understanding of the present invention may be obtained by reference to the accompanying drawings, when considered in conjunction with the subsequent, detailed description of preferred embodiments in which like elements and components bear the same designations and numbering throughout the figures.

DETAILED DESCRIPTION OF PREFERRED EMBODIMENTS

A new high pressure indictor has been invented and is disclosed herein using inexpensive, food-safe polymer particles, preferably wax, ranging from submicron size to approximately 9 microns, such as a range of 0.1 microns to 10 microns, dispersed in a clear binder or carrier, such as polyvinyl acetate or other water-based carrier, so as to form a pressure indicating material. Likewise, the inventive process also can be utilized to provide safe, non-toxic, silk screen printing capabilities.

While the experiments that have been performed on embodiments of the inventive device used a clear water-based carrier, other carriers potentially may be used. For example, UV-based binders can be used so long as the particles are not soluble in the UV-binder. The polymer particles can be incorporated into the UV-binder material, the UV-binder/particles combination painted onto the food product packaging, and the UV-binder hardened by exposure to UV light.

Figures 1A, 1B:
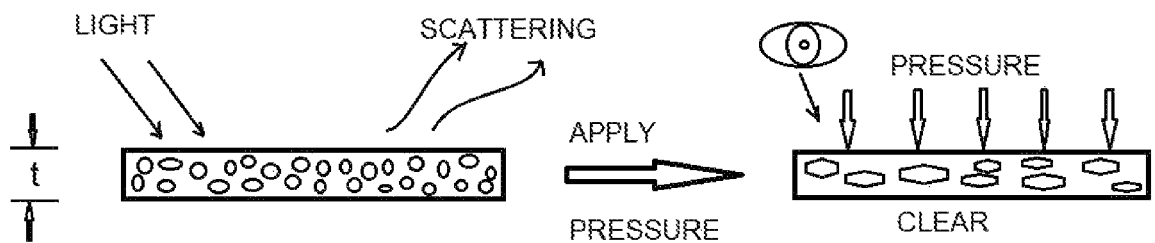
FIG. 1A illustrates a cross section of an embodiment of the inventive material prior to being subjected to high pressure.
FIG. 1B illustrates a cross section of an embodiment of the inventive material subsequent to being subjected to high pressure.
Figure 3:
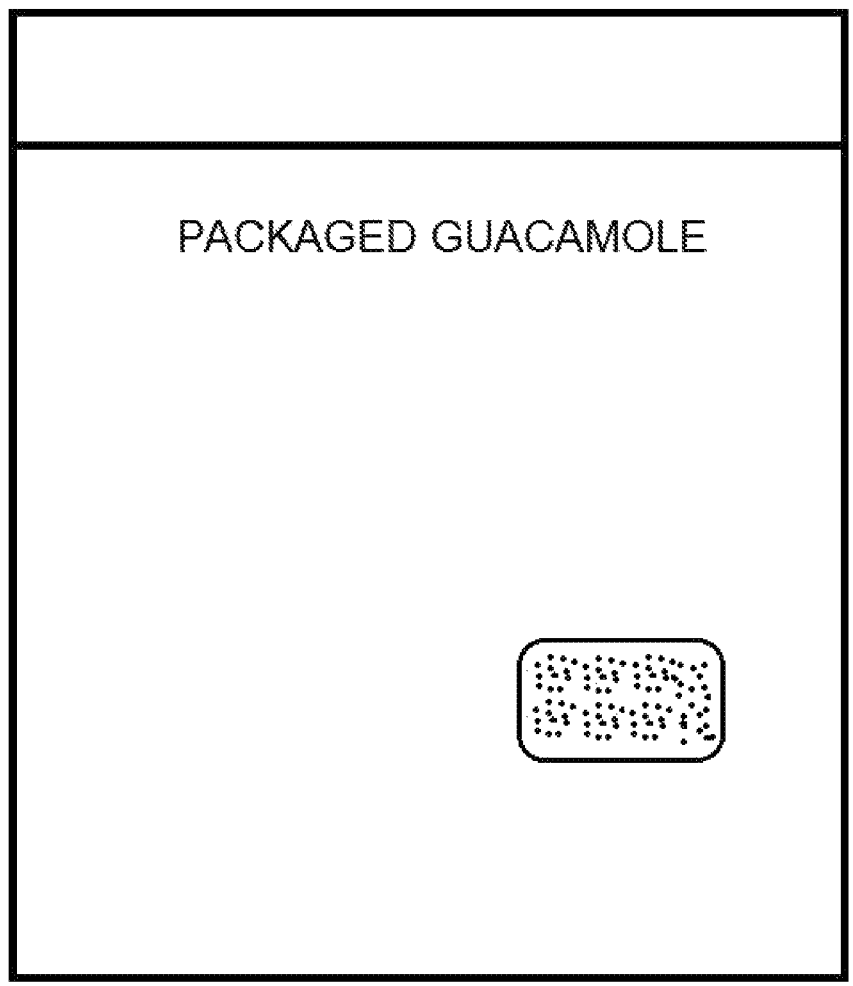
FIG. 3 illustrates an embodiment of the invention in which the invention is in the form of a sticker attached to packaging for a food product.
Figure 4:
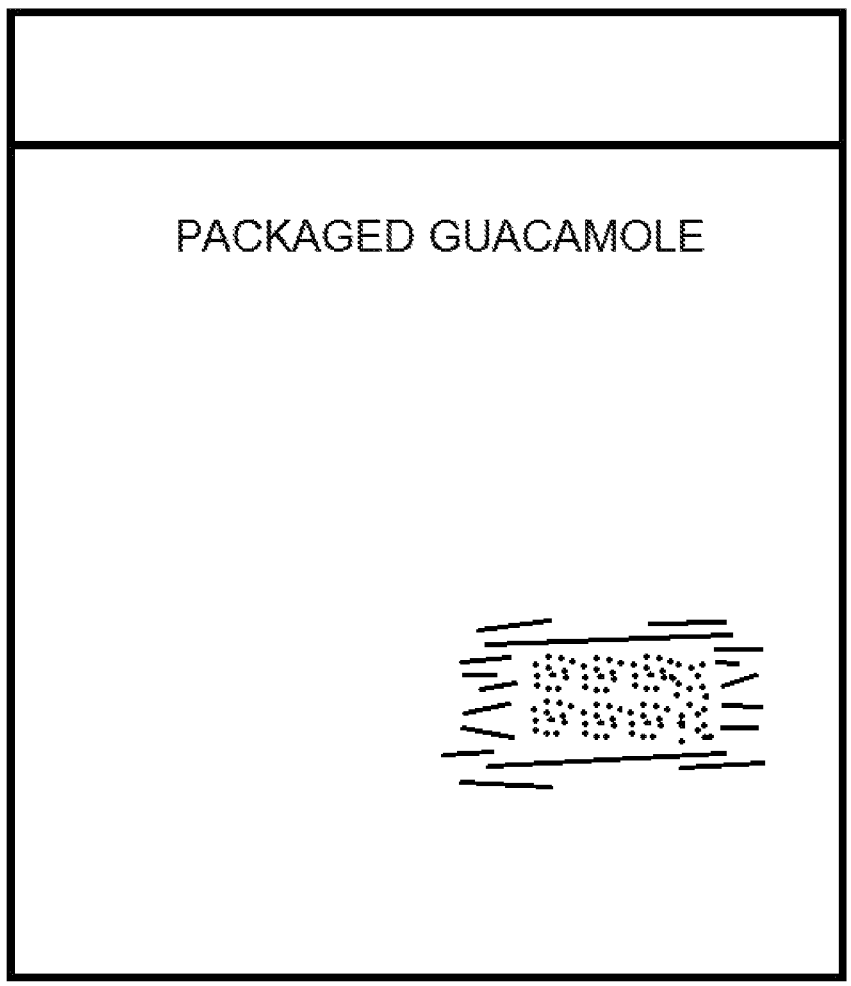
FIG. 4 illustrates an embodiment of the invention in which the invention is in the form of a coating or printing applied to packaging for a food product.

The inventive material can be printed or coated on the food product packaging, such as on poly bags, or on a label used on the food product or food product packaging. An illustrative example of the resulting dry film is shown in FIG. 1A, which illustrates a cross section of an embodiment of the inventive material prior to being subjected to high pressure. FIG. 3 illustrates an embodiment of the invention in which the invention is in the form of a sticker attached to packaging for a food product. FIG. 4 illustrates an embodiment of the invention in which the invention is in the form of a coating or paint applied to packaging for a food product.

As the small polymer or wax particles have a different index of refraction than the surrounding clear binder, the particles tend to scatter reflected light and appear to be white. The wax powders can be micronized wax powders, which can be purchased from, for example, companies such as Baker Hughes Micropowders, Chemcor Chemical Corporation, LCR Hallcrest LLC, Micro Powders, Inc., etc.

In FIG. 1A, a given thickness (t) film, t=2-8 microns, is shown, with the initial pre-pressure particles indicated schematically as circles or ovals. Upon exposure to high pressure, the polymer (wax) particles tend to flow and flatten, and possibly coalesce to form bigger particles, which are shown in FIG. 1B schematically as flattened hexagons. FIG. 1B illustrates a cross section of an embodiment of the inventive material subsequent to being subjected to high pressure. As shown, the initial pre-pressure particles have a white or whitish color, or are opaque or translucent, while the post-pressure particles have a clear or clearer color, or are transparent, hence the inventive material goes from white in color to clear upon the application of pressure. A viscoelastic material will take some time for flow to occur, the flow must occur very quickly over a time period of seconds. The advantage of this technology is that the indicator becomes transparent upon the application of pressure so that the indicator can be used with any packaging graphics, as a transparent indicator is less likely to interfere with packaging label graphics.

By having a tapered or multiple layer thickness coating, one may determine the pressure required to change the coating to transparent. So, one may plot thickness versus pressure to determine a given coating thickness that will become transparent at a certain pressure.

In general, higher melting polymers will require more time to flow at a given pressure. Hence, we have to generate a time versus melt temperature plot at a given pressure and a given thickness. Higher melt temperatures will require higher pressures to deform and become transparent.

To obtain accuracy, one may use a photo detection to measure the reflected light as the eye may not be able to measure percentage (%) reflectance=(after HPP)/(before HPP)

with great accuracy. By plotting thickness versus pressure, one can select the steepest curve to measure the pressure.

Experimental Data.

Following are some experimental data using various versions of the inventive material and method.

A knife coating of Chemcor Chemical Company paraffin emulsion having a melting point of 135° F.-150° F. in the form of a tapered thickness varying in dry thickness from 20 microns to 80 microns on a Mylar® polyester film. A similar knife coating of an LCR Hallcrest LLC micro dispersion product having a melting point of 250° F. was also knife coated with roughly a tapered thickness of 20 microns to 80 microns on a Mylar® polyester film. It was difficult to precisely measure the varying dry thickness.

The samples were subjected to varying pressures in a pressure chamber. The lower melt 135° F.-150° F. material went from white to clear at about 15,000 to 20,000 psi. The higher melt 250° F. material went from white to clear at about 20,000 to 30,000 psi.

Even the lower melt 135° F.-150° F. material at higher pressures of around 50,000 psi showed some white at the 80 micron thickness. The higher melt 250° F. material changed from white to clear at around 30,000 psi, although at a very large thickness of 80 microns or higher the higher melt 250° F. material was still white even when exposed to 50,000 psi for 3 minutes.

Some samples were left in the pressure chamber for 10 minutes at 50,000 psi and showed little or no change. However, these samples were viewed and recorded by camera and subjective viewing. A reflectometer might have shown some optical change.

The conclusion is that by both varying the melt temperature and the dry thickness of the coatings one can determine pressure. Thus, by knowing the melt temperature of the material and the coating thickness of the material, one can determine the pressure to which the material has been subjected to upon transition from clear to white. It is not clear that time at pressure can be measured without instrumentation and more testing.

In summary, the higher the melt temperature of the material, the greater the pressure to deform and flatten the light scattering properties. This is true also with thickness, in that the thicker the coating, the higher the pressure to flatten all the light scattering particles. Thus, one of ordinary skill in the art can choose both a melt temperature for the material and a thickness for the coating to indicate that a chosen pressure has been reached.

The use of a tapered thickness can provide a device and method for more accurately indicating a pressure reached. For example, extrapolating from the above examples, one could produce a coating or label incorporating a material that increases in thickness from a first end of the coating or label to a second end of the coating or label. More specifically, the first end of the coating or label could have a material thickness of 10-20 microns and the second end of the coating or label could have a material thickness of 80-100 microns. This tapered coating can be used to determine a specific or approximate or relative pressure reached. For example, if only the first end of the coating or label (i.e., 10-35 microns in thickness) becomes transparent, then the material has been subjected to a first, lower pressure. If only the first end and the middle section of the coating or label (i.e., 10-60 microns in thickness) becomes transparent, then the material has been subjected to a second, middle pressure. If the entire coating or label (i.e., 10-100 microns) becomes transparent, then the material has been subjected to a third, higher pressure. By selecting the type of material by melt temperature, one of ordinary skill in the art will be able to develop a thickness versus pressure profile for the coating or label.

Thus, an embodiment of the invention is a pressure indicator comprising a printed or coated thin film with micron sized particles disbursed in a transparent binder that will change from white to transparent when exposed to high pressure.

Another embodiment of the invention is the pressure indicator disclosed herein that has multiple coatings or a tapered film thickness to determine precise pressure.

Another embodiment of the invention is the pressure indicator disclosed herein that comprises viscoelastic particles that will flow at a low enough rate to show time.

Another embodiment of the invention is the pressure indicator disclosed herein in which the particles are polymers, and the specific polymer can be selected based on the desired pressure to be indicated. For example, different polymers soften or melt at different temperatures, and as the temperature and pressure are related by PV=nRT, with constant V, n, and R, as $T_M$ increases, $P_M$ increases, where $T_M$ is the melt temperature of the polymer and $P_M$ is the melt pressure of the polymer. Thus, a certain polymer that melts or softens at a certain temperature can be selected to indicate that a certain pressure has been reached, whereby polymers that melt or soften at a higher temperature will require a higher pressure to deform such that low melt temp polymers will deform, and therefore flow, at low pressures and high melt temp polymers will deform, and therefore flow, at high pressures.

Another embodiment of the invention is the pressure indicator disclosed herein used as an optical photo detector to measure percent reflectance to further obtain and record accurate pressure exposure.

The invention also is a method for indicating whether a certain pressure has been reached using the pressure indicator as disclosed herein.

Figure 2:
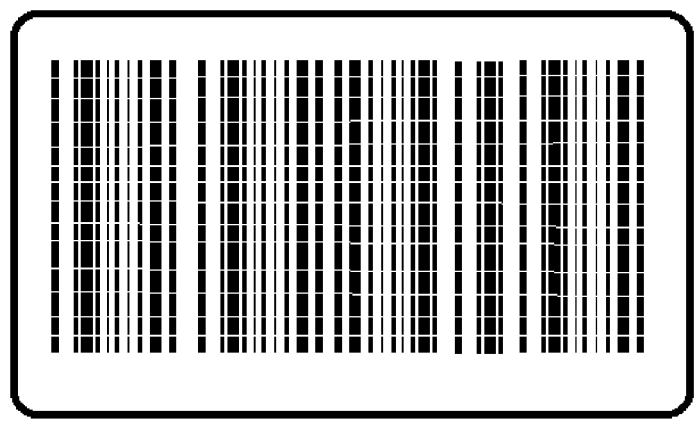
FIG. 2 illustrates an embodiment of the invention in which the particles are formed in the shape of a barcode.

Another embodiment of the invention is the pressure indicator disclosed herein wherein the particles are printed in the form of a barcode, as shown in FIG. 2. If the desired pressure is reached, the particles deform and/or flatten, and possibly coalesce, and the barcode becomes transparent. If the desired pressure is not reached, the barcode will remain visible. If the barcode is visible, then the user knows the food product has not been subjected to a pressure high enough to kill harmful organisms, and the user can destroy the entire lot of food products with that particular barcode designation without having to inspect each and every food product having that barcode designation and without having destroy all of the other food products not having that barcode designation.

The above detailed description of the embodiments, and the examples, are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A pressure indicator comprising a printed or coated film with micron sized particles disbursed in a transparent binder, wherein the particles will change from white to transparent when exposed to high pressure.

2. The pressure indicator as claimed in claim 1, wherein the particles size range is from submicron size to approximately 9 microns.

3. The pressure indicator as claimed in claim 1, wherein the particle size range is from 0.1 microns to 10 microns.

4. The pressure indicator as claimed in claim 1, wherein the binder is a water-based material.

5. The pressure indicator as claimed in claim 1, wherein the particles are food-safe polymer particles.

6. The pressure indicator as claimed in claim 1, comprising multiple coatings or a tapered film thickness resulting in a printed or coated film having a varying thickness, whereby the varying thickness is used to determine the pressure to which the pressure indicator has been subjected.

7. The pressure indicator as claimed in claim 6, wherein the tapered film thickness increases in thickness from a first end of the coating or label, through a middle section of the coating or label, to a second end of the coating or label.

8. The pressure indicator as claimed in claim 7, wherein:
a) if only the first end of the coating or label becomes transparent, then the material has been subjected to a first, lower pressure;
b) If only the first end and the middle section of the coating or label becomes transparent, then the material has been subjected to a second, middle pressure; and
c) If the entire coating or label becomes transparent, then the material has been subjected to a third, higher pressure.

9. The pressure indicator as claimed in claim 8, wherein by selecting a type of material by melt temperature, a thickness versus pressure profile for the coating or label is developed, whereby the pressure indicator is classified for a specific pressure or range of pressures.

10. The pressure indicator as claimed in claim 1, wherein the particles are viscoelastic.

11. The pressure indicator as claimed in claim 1, wherein the particles are polymers, and a certain polymer that melts at a certain pressure is selected to indicate that the certain pressure has been reached.

12. The pressure indicator as claimed in claim 1, wherein the binder is an ultraviolet light-based binder.

13. The pressure indicator as claimed in claim 12, wherein the particles are not soluble in the ultraviolet light-based binder.

14. The pressure indicator as claimed in claim 1, wherein the thin film is printed or coated on a food product or food product packaging.

15. The pressure indicator as claimed in claim 1, wherein thin film is incorporated on a label used on a food product or food product packaging.

16. The pressure indicator as claimed in claim 1, wherein, upon exposure to pressure, the particles tend to flow and flatten, whereby the initial pre-pressure particles are white or whitish in color, and the post-pressure particles are clear or clearish.

17. The pressure indicator as claimed in claim 1, wherein the particles are printed in the form of a barcode, whereby if the desired pressure is reached, the particles melt and the barcode becomes transparent.

18. A pressure indicator comprising a printed or coated thin film with micron sized particles disbursed in a transparent binder, wherein:

the particles will change from non-transparent to transparent when exposed to high pressure, whereby upon exposure to the high pressure, the particles tend to flow and flatten, whereby the initial pre-pressure particles are non-translucent and the post-pressure particles are transparent; and the particle size range is from 0.1 microns to 10 microns.

19. The pressure indicator as claimed in claim 18, further comprising multiple coatings or a tapered film thickness that increases in thickness from a first end of the coating or label, through a middle section of the coating or label, to a second end of the coating or label, resulting in a printed or coated thin film having a varying thickness, wherein:

a) if only the first end of the coating or label becomes transparent, then the material has been subjected to a first, lower pressure;

b) If only the first end and the middle section of the coating or label becomes transparent, then the material has been subjected to a second, middle pressure; and c) If the entire coating or label becomes transparent, then the material has been subjected to a third, higher pressure, whereby the varying thickness is used to determine the pressure to which the pressure indicator has been subjected.

20. The pressure indicator as claimed in claim 18, wherein the thin film is printed or coated on a food productor food product packaging, or is incorporated on a label used on a food product or food product packaging.

\* \* \* \* \*